July 6, 1971   D. L. CAMPBELL   3,591,363
RADIANT HEATED IRON ORE REDUCTION PROCESS
Filed Dec. 28, 1967
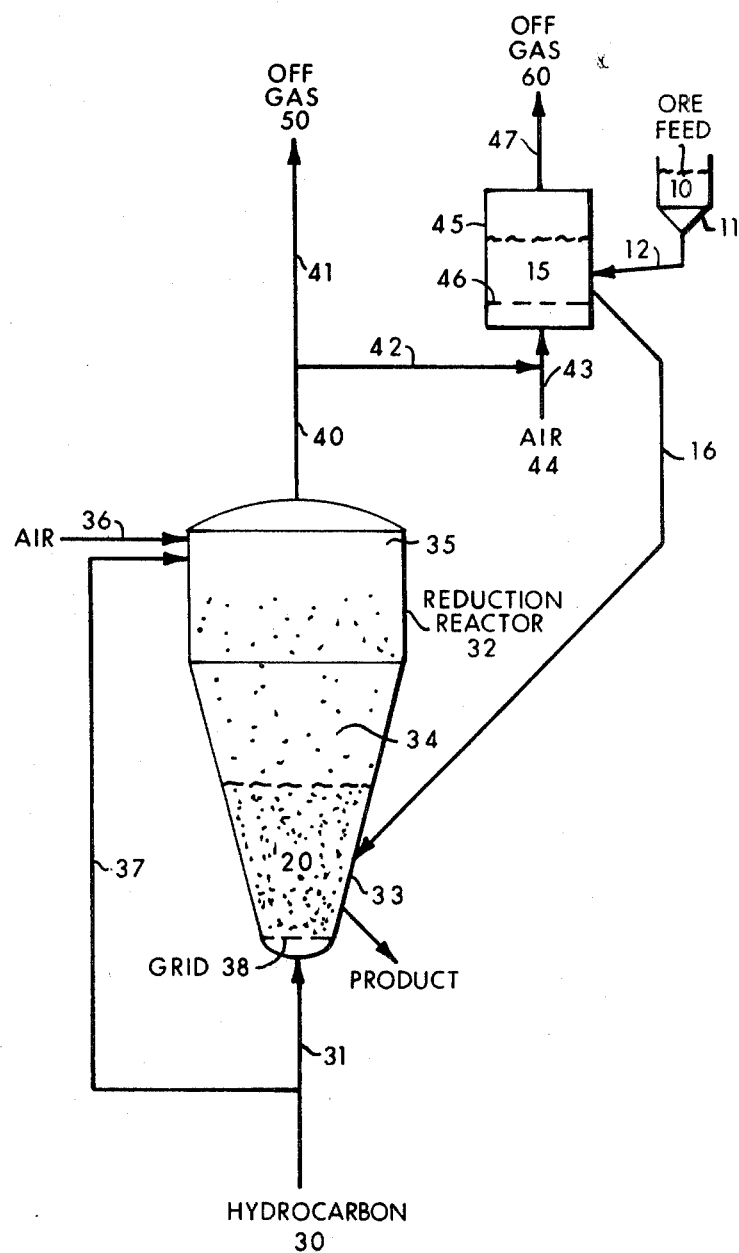
D. L. CAMPBELL   Inventor 3,591,363
RADIANT HEATED IRON ORE REDUCTION
PROCESS
Donald L. Campbell, Short Hills, N.J., assignor to Esso
Research and Engineering Company
Filed Dec. 28, 1967, Ser. No. 694,126
Int. Cl. C22b 5/14
U.S. Cl. 75—26
13 Claims

ABSTRACT OF THE DISCLOSURE

Highly metallized reduced iron ore is prepared in a continuous single-stage fluid bed process using hydrocarbon reductant. Radiant heat is supplied to the process by combusting above the bed the gases liberated in the process.

BACKGROUND OF THE INVENTION

This invention relates to the production of metallic iron from particulate oxidic iron ores. More particularly, it relates to a process wherein oxidic iron ores can be directly reduced with hydrocarbon gases or vapors in a single stage operation.

The reduction of oxidic iron ores in continuous fluidized processes is known. The operation of prior art processes, however, has led to numerous problems which result from the extreme complexity and sensitivity of the techniques used. One such prior art process is disclosed, e.g. in U.S. Pat. 3,246,978, issued Apr. 19, 1966. Therein is disclosed a multistage continuous ore reduction process in which oxidic ore feed is passed downwardly through a series of staged fluidized beds and reduced by countercurrent contacting with high temperature reducing gases. The reducing gases, which comprise principally carbon monoxide and hydrogen, are generated in an external gas generator by incomplete combustion of hydrocarbons with oxygen. Alternatively, reducing gases have been generated by means of catalytic reformers in which hydrocarbons are reacted with oxygen or steam to produce hydrogen and carbon monoxide. In using such reducing gas compositions, it has been necessary to employ at least two, and generally three or four or even more, staged fluidized reduction beds. Without such staging the reduction efficiency and process thermal efficiency are so low as to make the process completely impractical.

In the prior art processes, it has been considered essential to recover the reducing gases exiting from the top of the ore reduction reactor and regenerate them for further use. This requires a facility for removing the $H_2O$ and carbon dioxide which are produced by the reaction of carbon monoxide and hydrogen with iron oxides. It is also essential to cool the recovered gases, recompress them to the reduction reactor pressures, and then provide a heating furnace to reheat them to high temperature reducing conditions or at least to such a temperature that, when mixed with fresh reducing gas from a gas generator, the resulting mixture is at high temperature reducing conditions.

SUMMARY OF THE INVENTION

It is an objective of the present invention to provide the art with a continuous process for carrying out the fluidized reduction of oxidic iron ores without the necessity of employing a plurality of reducing stages. A further object is to provide such a process which is also adaptable to use without external reducing gas generating facilities. A particular objective of the present invention is to provide a single stage reduction process which achieves maximum utilization of reductant while eliminating the need for recovery and recycling unoxidized reducing gas.

This invention contemplates a process in which a hydrocarbon is injected directly into a single fluidized bed of iron ore which is maintained at reduction temperatures ranging from about 1000° F. up to just below the adhering or sticking temperature of the reduced ore, i.e., the temperature at which particles of reduced ore stick together causing defluidization or bogging of the bed. Preferably the temperature is maintained at about 1300° F. to 1600° F., whereby the hydrocarbon is converted or thermally cracked to carbon, hydrogen and some light hydrocarbons which products are then partially reacted with the iron oxides in the ore to reduce the oxides substantially to metallic iron while simultaneously forming gaseous carbon oxides, hydrogen and $H_2O$ (steam). The gases which are formed or liberated, along with any uncracked hydrocarbon feed, pass upwardly through the fluidized bed of ore, maintaining it in a fluidized condition, and then pass into a vapor space containing a combustion zone above the fluidized bed. Radiant heat for the endothermic cracking and reduction reaction is provided for the process by providing free oxygen-containing gases such as air and burning the combustible gases in the combustion zone of the vapor space.

In a preferred embodiment of the invention, particulate ore feed is contacted and prehead with hot exiting gases from the combustion zone in a separate fluidized bed, and the preheated ore is then passed directly to the reduction bed at about the same, or higher, temperatures as are employed therein. Thus, heat is added to the fluidized bed of the reduction stage of the process by means of the preheated ore feed and by radiation directly from the flames and indirectly from the refractory roof and walls of the reduction reactor.

The combustion zone temperatures are controlled to a range above about 3200° F. and generally at least about 3500° F. in order to provide sufficient radiation to maintain the desired reduction temperature in the fluidized bed below. The temperature in the combustion zone may not, of course, exceed a limiting maximum temperature which depends upon the quality and nature of the refractory materials in the reactor.

It is essential to prevent high entrainment from the fluidized reduction bed into the vapor space. Thus, unless the cross-sectional area in the vapor space of the reactor is enlarged to provide for very low gas velocities, it is necessary to maintain superficial gas velocities in the reducing bed of less than about 1.5 ft./sec. Preferably, substantially all of the fluidizing gas used is that produced from the hydrocarbon feed; however, additional gases such as hydrogen, carbon monoxide, or inert gases such as nitrogen can be added to improve fluidization.

To maintain efficient heat distribution throughout the bed, the superficial gas velocity should be substantially above incipient fluidization velocity and preferably ranges from about 0.5 to about 1.2 ft./sec., or even lower for ores containing substantial quantities of fine particles smaller than about 50 microns. If the gas velocity is too high, particles of reduced ore from the bed will be entrained upwardly with the exiting gases into the vapor space where they will be back-oxidized to iron oxides by the flames. The iron oxides, some of which may then fall back into the fluidized bed below, will tend to lower the average metallization of the bed and reduce the product metallization. Furthermore, it is an important feature of this invention to avoid the necessity for employing expensive cyclone separators at high temperatures, and thus, it is desirable to maintain low entrainment rates to prevent excessive losses of reduced ore from the process.

Suitable superficial gas velocities through the reducing bed are achieved by employing a tapered fluid bed of upwardly increasing cross section, i.e., the diameter and cross-sectional area are greater at the top of the bed than at the bottom. The extent of the taper depends somewhat upon the type of hydrocarbon feed employed and upon the amount of inert gases which may be present in the feed, or which may be added to improve fluidization or act as a diluent in the system. Thus, for example, when a light hydrocarbon such as methane is used, one mole of the hydrocarbon gas may produce as much as three moles of carbon oxides, water, and hydrogen. Consequently, unless a sufficient degree of tapering is provided the superficial gas velocity at the top of the fluid bed may be as much as three times that at the bottom.

It is also important to provide sufficient disentrainment space between the surface of the fluid bed and the flames in the combustion zone of the vapor space to allow a major portion of entrained finely divided particles to fall back into the fluidized bed before contacting the flames. In order to achieve sufficient disentrainment for practical operations with ore particles of conventional sizes, it is necessary to allow at least about 15 feet of disentrainment space and preferably at least about 30 feet. When ore containing significant amounts of particles less than about 50 microns in size is employed, it is desirable to provide even greater cross-sectional areas in the vapor space than at the top of the fluid bed. In such cases, the reactor diameter in the vapor space should be sufficient to provide gas velocities in the vapor space of about 0.2 to 0.5 ft./sec. to ensure that very fine particles are disentrained.

BRIEF DESCRIPTION OF THE DRAWING

The invention will be more fully understood by reference to the accompanying drawing which shows a preferred embodiment of the invention in which an oxidic ore is reduced to a substantially metallic iron product having a metallization of about 95%.

DESCRIPTION OF THE PREFERRED EMBODIMENTS

Referring specifically to the drawing, feed 10 containing principally iron ore and a small amount of gangue is introduced by means of a lock hopper 11 and standpipe 12 into a fluidized bed preheating zone 15 wherein it is heated to about 1500° F. The preheated ore is then passed via standpipe 16 into a fluidized bed reduction zone 20 in which it is reduced substantially to metallic iron in a single stage reduction operation. The ore particles range in particle size generally from about 50 to about 600 microns, averaging about 200 microns, in diameter. The product metallization measures about 95%, i.e., the percentage of total iron present as metallic Fe in the product is about 95%.

The reduction process is carried out by introducing a preheated hydrocarbon feed 30 by means of inlet line 31 into the bottom of a reduction reactor 32. The preheated hydrocarbon gas or vapor is introduced at a temperature of about 1100° F. and is distributed by means of grid 38 and dispersed in fluidized bed 20 wherein it is converted or cracked substantially entirely to hydrogen, carbon, and some light hydrocarbons.

The hydrocarbon feed 30, natural gas in this example, is introduced into bed 20 at a superficial gas velocity of about 1.0 feet per second. The diameter of the fluid bed increases upwardly within tapered zone 33 of the reactor 32. The increase in diameter of the tapered zone 33 results in a cross-sectional area at the surface of the fluid bed 20 which is about three times that at the bottom, i.e., at grid 38.

The hydrogen and carbon which are produced from the natural gas are partially further reacted with ore to form $CO$, $CO_2$, and $H_2O$ gases, while simultaneously producing reduced ore product which is drawn from the reactor as shown in the drawing. The liberated gases leave the surface of fluid bed 20 and pass into vapor space 34 wherein the major portion of entrained iron oxide particles disengage from the gas and fall back to the fluidized bed 20. The gases then pass into combustion zone or flame space 35 at the top of the reduction reactor. In the combustion zone, combustion is maintained by introducing preheated air at inlet 36. An optional technique also provides for the introduction of natural gas directly into the combustion zone to provide still greater quantities of heat to the process by means of inlet line 37. The height of the vapor space 34 between the surface of fluid bed 20 and combustion zone 35 is maintained at about 35 feet in order to avoid excessive back-oxidation by contact of entrained reduced ore particles with the flames.

Combustion gases from combustion zone 35 are removed from the reduction reactor via outlet 40. The hot combustion gases are partially recovered as off-gas 50 through outlet line 41. Heat is recovered from the gases and used, e.g., to preheat the incoming hydrocarbon and air streams 30 and 36, respectively, by conventional heat exchangers (not shown).

A portion of the hot combustion gases is passed through line 42 with cold air 44 to lower its temperature to about 1700° F. The mixed gases are then passed into preheater vessel 45, distributed by means of grid 46 and dispersed in a fluidized bed of incoming iron ore feed 15, thereby fluidizing and preheating the feed. The spent gases are then removed through outlet line 47 and recovered as off-gas 60.

The entire reduction process can be operated at substantially atmospheric pressure, in which case the ore feed hopper 11 can be an ordinary open feed system. Preferably, however, the process is maintained at superatmospheric pressures in order to minimize equipment size for a given solids and gas throughput. In the latter case the feed system preferably comprises a lock hopper or series of lock hoppers in gas-sealed relationship with the preheat reactor.

The grids 38 and 46 in the reduction reactor and preheater can be made of conventional high temperature resistant refractory suitable for the reduction and preheat temperatures involved. Special refractories are required for the refractory material which is in contact with flames in the vapor space of the reduction reactor, and it is preferred to use alumina or similar high temperature resistant refractory materials.

It is unnecessary to provide a great deal of vapor space in the preheater 45 since this vessel can be provided with conventional gas-solids separators, e.g., cyclone separators (not shown) to remove entrained solids from the exiting gases. Separators, however, are impractical in the reactor due to the extremely high temperatures involved, and maintenance of sufficient disentrainment space is essential to successful operation of the process. The gases from both the reduction reactor and the preheater will, of course, contain very small amounts of extremely finely divided particles, e.g., particles of only a few microns or submicrons in size.

The process of this invention can be carried out using any convenient hydrocarbons, although natural gas, light petroleum naphthas, methane, and other light hydrocarbons, are preferred. Similarly, the process is operable with any conventional oxidic iron ore which is ground to within fluidizable particle size ranges. The precise reduction conditions will vary somewhat depending on the type of ore and reductant selected. Thus, an ore which is difficult to reduce requires longer nominal holding times in the reduction reactor than an easily reducible ore. The invention however, is not to be limited to any particular set of operating variables since many variations and alternative operations will be readily apparent to one skilled in the art.

What is claimed is:

1. A single stage process for reducing particulate oxidic iron ores to metallic iron comprising:
    establishing a fluidized bed of oxidic iron ore in a reduction reactor;
    introducing a hydrocarbon feed into the fluidized bed to reduce the ore substantially to metallic iron while simultaneously the hydrocarbon is partially converted to a combustible gas containing a component selected from the group consisting of hydrogen, carbon monoxide, light hydrocarbons, and mixtures thereof;

maintaining superficial gas velocity sufficient to provide a vapor space in the reduction reactor above the fluidized bed;

passing the combustible gas upwardly into the vapor space;

providing free oxygen in the vapor space and burning said combustible gas therein to radiate heat;

transmitting the heat to the fluidized bed in amounts sufficient to maintain said bed at reduction temperatures; and recovering substantially metallic iron from the fluidized bed.

2. The process of claim 1 wherein said fluidized bed is maintained at temperatures ranging from about 1000° F. to just below the sticking temperature of the ore.

3. The process of claim 2 wherein said fluidized bed temperature is maintained between about 1300° F. and about 1600° F.

4. The process of claim 1 wherein said bed is fluidized by providing therein a fluidizing gas at superficial gas velocities above the incipient fluidization velocity of the bed and below about 1.5 ft./sec., whereby substantial entrainment of the particulate ore is avoided.

5. The process of claim 4 wherein said superficial gas velocities range from about 0.5 ft./sec. to about 1.2 ft./sec.

6. The process of claim 4 wherein substantially all of said fluidizing gas is produced from the hydrocarbon feed.

7. The process of claim 4 wherein said fluidized bed is tapered to provide greater cross-sectional areas at the top of the bed than at the bottom, whereby as said hydrocarbon feed is converted to greater volumes of said combustible gas ascending through the bed, the superficial gas velocity is maintained substantially constant.

8. The process of claim 4 wherein said vapor space is at least about 15 feet above said fluidized bed, whereby at least a major portion of entrained particulate ore from the bed disentrains and falls back into the bed without contacting the burning gases in the said combustion zone.

9. The process of claim 8 wherein said vapor space is at least about 30 feet above said fluidized bed.

10. The process of claim 1 wherein said vapor space is maintained at temperatures above about 3200° F. and is housed within a refractory-lined reactor designed to reflect radiation downwardly to said fluid bed.

11. The process of claim 10 wherein the vapor space is maintained at temperatures above about 3500° F.

12. The process of claim 11 wherein fuel is added directly to said vapor space to be burned and supplement said combustible gases.

13. The process of claim 1 wherein hot gases are withdrawn from said vapor space and contacted with said ore feed in a fluidized preheat bed to preheat the ore before introducing said ore to the fluidized reduction bed.

References Cited

UNITED STATES PATENTS

| | | | |
|---|---|---|---|
| 116,558 | 7/1871 | Cochrane | 75—34 |
| 2,397,352 | 3/1946 | Hemminger | 75—26X |
| 2,742,352 | 4/1956 | Gilliland | 75—26 |
| 2,831,759 | 4/1958 | Osborn | 75—26 |
| 2,990,269 | 6/1961 | Hyde | 75—34X |
| 3,053,648 | 9/1962 | Stephens, Jr. et al. | 75—26 |
| 3,369,888 | 2/1968 | Cruse, Jr. | 75—34 |
| 3,364,011 | 1/1968 | Porter, Jr. et al. | 75—26 |
| 2,774,662 | 12/1956 | Graham et al. | 75—26 |

ALLEN B. CURTIS, Primary Examiner

M. J. ANDREWS, Assistant Examiner